United States Patent
Basak et al.

(10) Patent No.: US 10,984,345 B2
(45) Date of Patent: Apr. 20, 2021

(54) MANAGEMENT OF POWER SOURCES AND JOBS IN AN INTEGRATED POWER SYSTEM

(75) Inventors: Jayanta Basak, New Delhi (IN); Venkatesan Chakaravarthy, New Delhi (IN); Vinayaka Pandit, Bangalore (IN); Yogish Sabharwal, Haryana (IN); Devasenapathi P. Seetharamakrishnan, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1322 days.

(21) Appl. No.: 12/791,505

(22) Filed: Jun. 1, 2010

(65) Prior Publication Data

US 2011/0295635 A1 Dec. 1, 2011

(51) Int. Cl.
*G06Q 10/00* (2012.01)
*G06Q 10/06* (2012.01)
*H02J 3/00* (2006.01)

(52) U.S. Cl.
CPC ......... *G06Q 10/00* (2013.01); *G06Q 10/0631* (2013.01)

(58) Field of Classification Search
CPC .................................................... G06Q 10/00
USPC ......................................................... 705/7.12
See application file for complete search history.

(56) References Cited

U.S. PATENT DOCUMENTS

| | | | |
|---|---|---|---|
| 6,744,879 B1* | 6/2004 | Dezonno | H04M 3/5166 379/265.05 |
| 6,963,802 B2 | 11/2005 | Enis et al. | |
| 7,110,832 B2 | 9/2006 | Ghent | |
| 7,208,697 B2* | 4/2007 | Blankenship | B23K 9/0953 219/130.21 |
| 7,274,975 B2 | 9/2007 | Miller | |
| 2003/0009265 A1* | 1/2003 | Edwin | G06Q 10/06 700/295 |
| 2004/0215545 A1* | 10/2004 | Murakami et al. | 705/36 |
| 2005/0049759 A1* | 3/2005 | Machitani | H02J 3/008 700/297 |
| 2005/0055137 A1* | 3/2005 | Andren | G06Q 30/02 700/291 |
| 2006/0009989 A1* | 1/2006 | McCormick | G06Q 10/06 705/7.36 |
| 2007/0005195 A1* | 1/2007 | Pasquale et al. | 700/295 |
| 2007/0203860 A1 | 8/2007 | Golder | |
| 2007/0271475 A1* | 11/2007 | Hatasaki et al. | 713/324 |

(Continued)

OTHER PUBLICATIONS

92 P.S. Georgilakis, N.D. Hatziargyriou, Electric Power Systems Research, .2015, Elsevier, 93-95 (Year: 2015).*

*Primary Examiner* — Patricia H Munson
*Assistant Examiner* — V K Puri
(74) *Attorney, Agent, or Firm* — Ference & Associates LLC

(57) ABSTRACT

Methods and systems for managing energy sources and energy consumers in an integrated system are provided. Certain subject matter presented herein relates to automatically scheduling jobs and their sub-tasks to maximize profit by comparing power source configurations and determining the best job schedule for the power source configurations. This system broadly involves two sub-problems: determining the best power source configuration and determining the best job schedule for the given power source configuration.

14 Claims, 7 Drawing Sheets

(56) References Cited

U.S. PATENT DOCUMENTS

| | | | |
|---|---|---|---|
| 2007/0276547 A1* | 11/2007 | Miller | G06Q 50/06 700/295 |
| 2008/0065919 A1* | 3/2008 | Hatasaki et al. | 713/324 |
| 2009/0319090 A1* | 12/2009 | Dillon | G06Q 10/04 700/291 |
| 2009/0326726 A1* | 12/2009 | Ippolito et al. | 700/291 |
| 2010/0010857 A1* | 1/2010 | Fadell | 705/8 |
| 2010/0217642 A1* | 8/2010 | Crubtree | G06Q 10/00 705/7.12 |
| 2010/0274602 A1* | 10/2010 | Kaufman et al. | 705/7 |
| 2011/0173626 A1* | 7/2011 | Chi et al. | 718/103 |
| 2011/0204717 A1* | 8/2011 | Shaffer | G06Q 40/04 307/18 |
| 2011/0246987 A1* | 10/2011 | Diwakar et al. | 718/1 |

\* cited by examiner

MANAGEMENT OF POWER SOURCES AND JOBS IN AN INTEGRATED POWER SYSTEM

BACKGROUND

The subject matter described herein generally relates to managing energy sources and energy consumers in an integrated system, such as a microgrid energy system. Certain subject matter presented herein relates to automatically scheduling jobs and their sub-tasks to maximize profit by comparing power source configurations and determining the best job schedule for the power source configurations.

A microgrid is an integrated energy system consisting of interconnected loads and distributed energy resources which can operate in parallel with the main power grid or as an independent, separate energy grid. Microgrids can be independent from the main power grid because they are able to generate their own energy using local alternate energy sources, such as photovoltaic, wind turbines, and diesel power generators to power the loads in the system.

The recent increase in popularity of microgrids is due to the strong interest in reliable and clean energy sources. In particular, microgrids offer the following benefits: (1) reduced cost, since many utility companies are introducing time of use pricing, microgrids reduce the cost of energy by using local energy sources when cost of grid energy is high, (2) increased reliability, because having local energy sources improves reliability and reduces the dependence on the main power grid, (3) reduction of environmental impact through use of cleaner energy sources, and (4) increased energy security through the geographical dispersal of power resources.

As such, existing microgrids are able to provide users with more reliable energy sources that are not as susceptible to problems occurring in the main power grid. In addition, microgrids are able to provide cost savings to users because microgrid energy sources can be used instead of the main power system when it is more cost effective to be off of the main grid, such as during times of peak energy consumption.

In addition, existing microgrid technology has been used to perform some basic management of energy consuming devices based upon historical data, weather forecasts, and consumer demands on the main power grid. However, such existing microgrid technology has been focused on scheduling upper level energy consumers and jobs based upon straightforward cost calculations which do not take account of profit or job sub-tasks.

BRIEF SUMMARY

Embodiments of the invention broadly contemplate systems, methods, apparatuses and program products configured to manage energy sources and energy consumers in an integrated system. Certain embodiments, involving a numerable arrangement of power sources and scheduling time slots, generate power configurations, determine preferred job schedules and profit densities for the power configurations, and store the power configurations, job schedules and maximum profit density. Certain embodiments, involving a large number of power sources and available time slots, generate power configurations, derive the estimated profit for the power configurations, determine the preferred power configuration for maximizing profit, generate a job schedule for a preferred power configuration, compute profit density, and store the preferred power configuration, generated job schedule, and profit density. Certain embodiments schedule jobs according to expected costs, profit density and prioritized scheduling. According to an embodiment of the invention, the preferred power configuration is the optimal power configuration for which profit is maximized.

In summary, one aspect provides a method comprising: identifying one or more power sources and one or more jobs associated with one or more integrated power systems; ascertaining job characteristics for each of the one or more jobs; ascertaining power characteristics for each of the one or more power sources; generating one or more power source configurations out of the one or more power sources; distinguishing one or more preferred power source configurations from the one or more power source configurations based on the job characteristics and the power characteristics; and scheduling the one or more jobs utilizing one or more preferred power source configurations.

Another aspect provides a system comprising: one or more integrated power systems; one or more power sources and one or more jobs associated with the one or more integrated systems; a set of job characteristics for each of the one or more jobs; and a set of power characteristics for each of the one or more power sources; wherein one or more power source configurations are generated out of the one or more power sources; wherein one or more preferred power source configuration are distinguished based on the set of job characteristics and the set of power characteristics; wherein the one or more jobs are scheduled utilizing the one or more preferred power source configurations.

A further aspect provides a computer program product comprising: a computer readable storage medium having computer readable program code embodied therewith, the computer readable program code comprising: computer readable program code configured to identify one or more power sources and one or more jobs associated with one or more integrated power systems; computer readable program code configured to ascertain job characteristics for each of the one or more jobs; computer readable program code configured to ascertain power characteristics for each of the one or more power sources; computer readable program code configured to generate one or more power source configurations out of the one or more power sources; computer readable program code configured to distinguish one or more preferred power source configuration based upon the job characteristics and the power characteristics; and computer readable program code configured to schedule the one or more jobs utilizing the one or more power source configurations.

The foregoing is a summary. For a better understanding of exemplary embodiments, together with other and further features and advantages thereof, reference is made to the following description, taken in conjunction with the accompanying drawings, and the scope of the invention will be pointed out in the appended claims.

DETAILED DESCRIPTION

It will be readily understood that components of the embodiments, as generally described and illustrated in the figures herein, may be arranged and designed in a wide variety of different configurations in addition to the described example embodiments. Thus, the following more detailed description of embodiments, as represented in the figures, is not intended to limit the scope of the invention, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that various embodiments can be practiced without one or more of the specific details, or with other methods, components, materials, et cetera. In other instances, well-known structures, materials, or operations are not shown or described in detail to avoid obfuscation.

Given the many benefits of microgrids, more and more industrial and commercial establishments are starting to incorporate microgrids into their operations. These commercial and industrial establishments need an automatic scheduling system that schedules their jobs to maximize profits and power quality, while minimizing energy costs and environmental impact, for example, from conventional energy sources such as coal.

Figure 1:
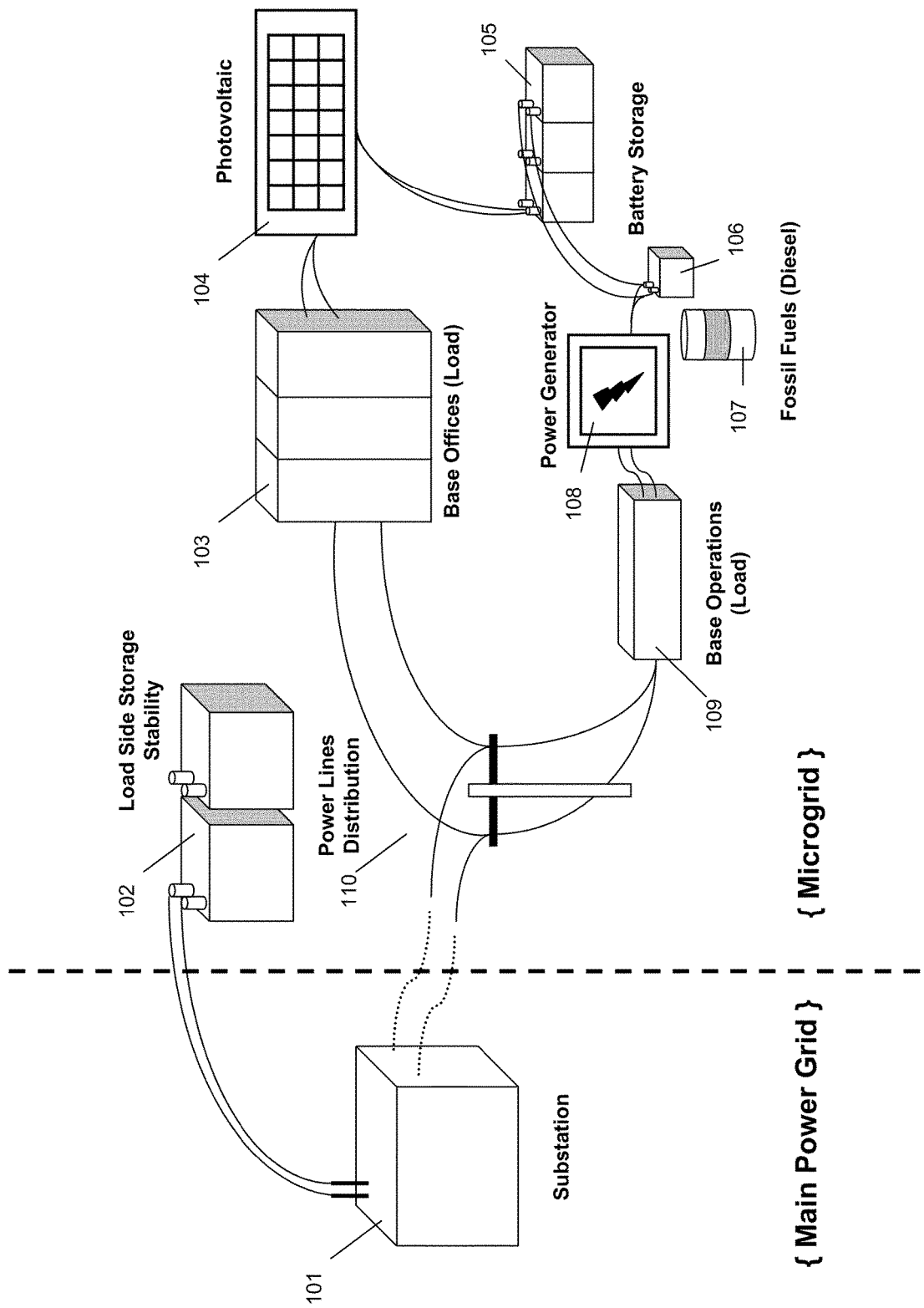
FIG. 1 illustrates a microgrid.

Referring now to FIG. 1, therein is depicted an illustrative embodiment of a microgrid system. As is apparent from the description, however, the embodiments of the invention may be implemented in any appropriately configuration, as described herein.

As shown in FIG. 1, a microgrid according to an embodiment of the invention is operatively connected to a main power grid substation 101, and includes one or more local energy sources, such as photovoltaic 104 or a power generator 108 which may run on fossil fuel 107. In addition, one or more battery storage units 105 and 106 may be dispersed within the system and connected to various local power sources. A distribution system 110, such as a power line distribution system, is utilized to distribute power throughout the microgrid. The energy consumers 103 and 109, or loads, may be connected directly to the various power sources 101, 104, and 108 or may be connected with them through the microgrid power distribution system 109. As depicted in FIG. 1, the microgrid system is able to operate using power drawn from the traditional main power grid and autonomously utilizing local power sources.

Although a main benefit of utilizing a microgrid system is energy reliability, existing microgrid technology has also been used to perform some basic management of energy consuming devices. However, existing microgrid systems have several shortcomings because they are not sophisticated enough to handle the complex loads of industrial customers.

One shortcoming is that they don't support specifying sub-tasks within jobs. As a non-limiting example, the PCB fabrication process involves several sub-tasks, such as electroplating, drilling, and applying the solder mask. As such, a microgrid system applied to the PCB fabrication process according to existing technology would only be able to manage the upper level PCB fabrication jobs and not the individual electroplating, drilling and solder mask application sub-tasks that make up each job. Another limitation with existing microgrid technology is that it also does not support sequencing sub-tasks within jobs. For example, existing microgrid technology applied to PCB fabrication would not be able to sequence sub-tasks to ensure that the electroplating sub-task preceded the solder mask application sub-task.

Existing microgrid technology is further constrained because it does not consider potential profits when scheduling jobs. Instead, it blindly defers jobs to minimize energy consumption and costs. For example, it might be profitable to run a job even though energy prices are high provided that the expected profit from that job is higher. A further shortcoming is that existing microgrid technology does not use weather forecasts in conjunction with other system information to schedule jobs. For example, if a solar energy source is available and a job can be deferred to a day when solar energy is likely to be available, it might be better to run that job using solar power instead of the electrical power from the grid.

In accordance with at least one presently preferred embodiment of the present invention, there is broadly contemplated herein a scheduling system for automatic job scheduling that produces schedules that lead to maximum profit and minimum environmental impact. This system broadly involves two sub-problems: determining the best power source configuration and determining the best job schedule for the given power source configuration. In addition, certain embodiments of the invention provide that determining the best power source configuration itself requires determining the best job schedules over a variety of power source configurations.

In a preferred embodiment, the scheduling system takes in individual lists of machines, power sources, and jobs as input parameters. The list of machines $M_1, \ldots, M_n$ may be given by $M_i(W)$, wherein W is the energy in Watts required for the particular machine. The list of power sources $P_1, \ldots, P_n$ may be given by $P_i$ ([$t_{ij}, c_{ij}$], $C_i$, $W_{max}$), wherein $t_{ij}$ is the time interval, $c_{ij}$ is the cost of energy during that time interval, $C_i$ is the amount of carbon emitted per output unit, and $W_{max}$ is the maximum available power supply. The list of jobs $J_1, \ldots, J_n$ may be given by $J_i([T_{ij}(m_{ij}, d_{ij})], G_i, Pr_i, B_i, E_i)$ wherein $G_i$ is the estimated profit, $Pr_i$ is the priority, $B_i$ is the earliest time at which the job can be started, $E_i$ is the latest time at which the job must be completed, and [$T_{ij}(m_{ij}, d_{ij})$] is the list of tasks, wherein the machines and the duration for which each one is required for the job is specified by $m_{ij}$ and $d_{ij}$, respectively. In addition, embodiments provide that the task sequence can be specified as one or more directed acyclic graphs and their temporal ordering will be preserved.

According to a preferred embodiment, the scheduling system utilizes the machines, power sources and jobs parameter inputs, and produces a job and power source schedule that maximizes the profit obtained by scheduling the jobs under one or more of the following constraints: (1) one power source may be scheduled at any point in time, (2) the total energy consumed by all of the jobs scheduled at any point in time must be less than or equal to the maximum power supplied by the power sources available at that time, (3) higher priority jobs must be scheduled before lower priority jobs as much as possible, for example, if there are two jobs of equal priority that contend for the same set of machines, and if there is a job of lower priority that can run with the unallocated machines, then the lower-priority job may be scheduled before the deferred higher-priority job, (4) if there are two jobs of equal priority, the job with higher profit should be chosen, if they have equal priority and equal profits, one of those jobs could be chosen arbitrarily, and (5) multiple jobs can be scheduled at the same time provided the set of machines they require are non-overlapping.

In accordance with at least one presently preferred embodiment of the present invention, there is broadly contemplated herein methods for determining the power source configurations for microgrid systems configured according to embodiments of the present invention. Let $P=(p_1, p_2, \ldots, p_n)$ be a configuration of power sources at n distinct time intervals, $P(i)=(p_{i1}, p_{i2}, \ldots, p_{in})$ be the $i^{th}$ instance of a particular power configuration, and G be the specific profit derived for one such power configuration P, such that G(i) is the profit-optimal job schedule for a given power source configuration P(i). Embodiments of the invention provide for the collection of a set of N such instances $[P,G]=[(P(i), G(i))|i=1, 2, \ldots N)$ for the determination of a preferred power configuration P(Opt) for which profit is maximized G(Opt). Accordingly, an embodiment of the invention provides that the preferred power configuration is the optimal power configuration for which profit is maximized.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
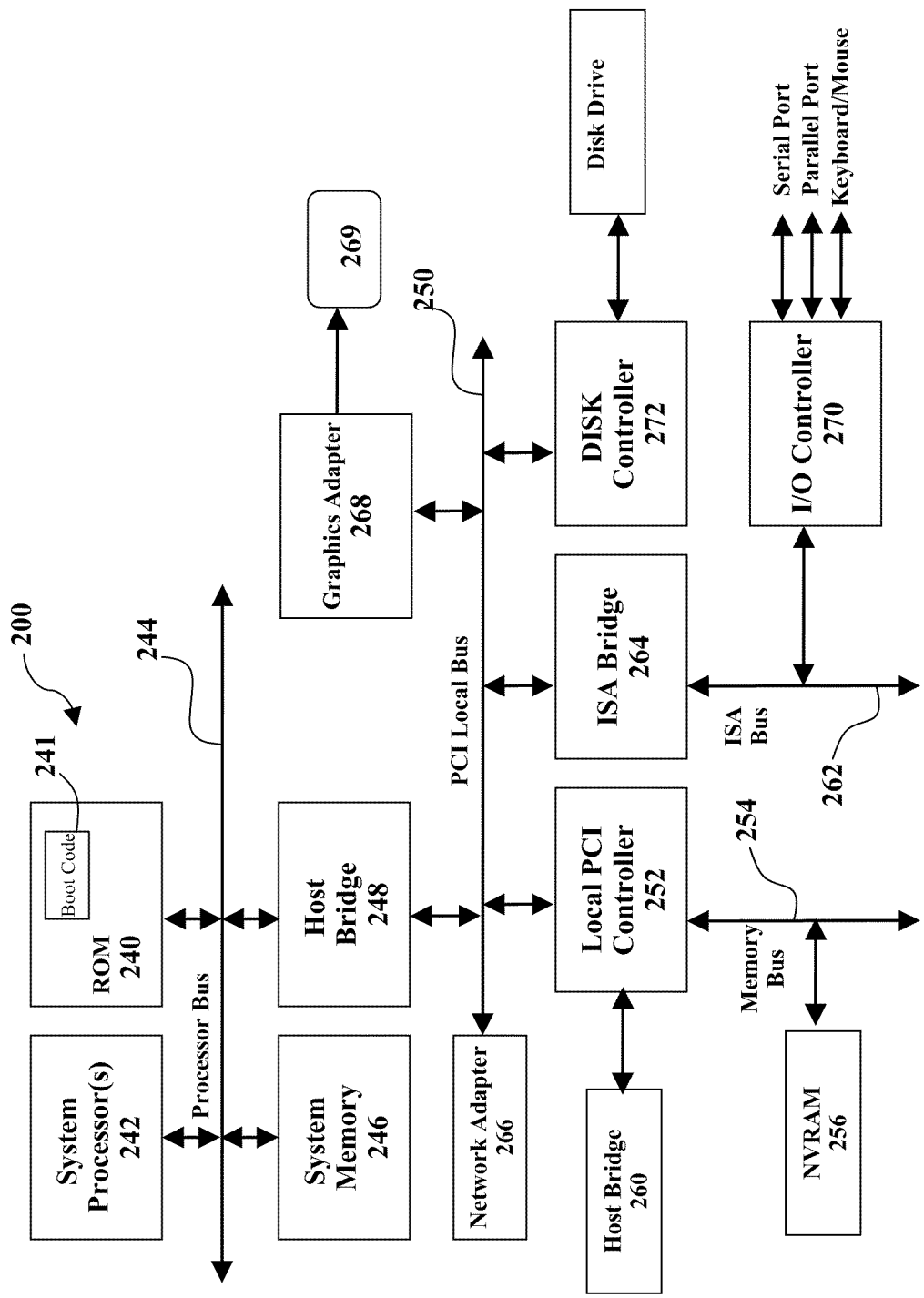
FIG. 2 illustrates a computer system.

Referring now to FIG. 2, there is depicted a block diagram of an illustrative embodiment of a computer system 200. The illustrative embodiment depicted in FIG. 2 may be an electronic device such as a laptop or desktop personal computer, a mobile/smart phone or the like. As is apparent from the description, however, the embodiments of the invention may be implemented in any appropriately configured device, as described herein.

As shown in FIG. 2, computer system 200 includes at least one system processor 242, which is coupled to a Read-Only Memory (ROM) 240 and a system memory 246 by a processor bus 244. System processor 242, which may comprise one of the AMD line of processors produced by AMD Corporation or a processor produced by INTEL Corporation, is a general-purpose processor that executes boot code 241 stored within ROM 240 at power-on and thereafter processes data under the control of an operating system and application software stored in system memory 246. System processor 242 is coupled via processor bus 244 and host bridge 248 to Peripheral Component Interconnect (PCI) local bus 250.

PCI local bus 250 supports the attachment of a number of devices, including adapters and bridges. Among these devices is network adapter 266, which interfaces computer system 200 to LAN, and graphics adapter 268, which interfaces computer system 200 to display 269. Communication on PCI local bus 250 is governed by local PCI controller 252, which is in turn coupled to non-volatile random access memory (NVRAM) 56 via memory bus 254. Local PCI controller 252 can be coupled to additional buses and devices via a second host bridge 260.

Computer system 200 further includes Industry Standard Architecture (ISA) bus 262, which is coupled to PCI local bus 250 by ISA bridge 264. Coupled to ISA bus 262 is an input/output (I/O) controller 270, which controls communication between computer system 200 and attached peripheral devices such as a as a keyboard, mouse, serial and parallel ports, et cetera. A disk controller 272 connects a disk drive with PCI local bus 250. The USB Bus and USB Controller (not shown) are part of the Local PCI controller (252).

The system 200 shown in FIG. 2 is but an example of a computer system that could be operatively connected to a microgrid system according to an embodiment of the invention to configure and manage the automated power source and job scheduling as described herein. Other suitable computer systems for use in accordance with embodiments of the present invention of course can be employed within the scope of embodiments of the present invention.

Figure 3:
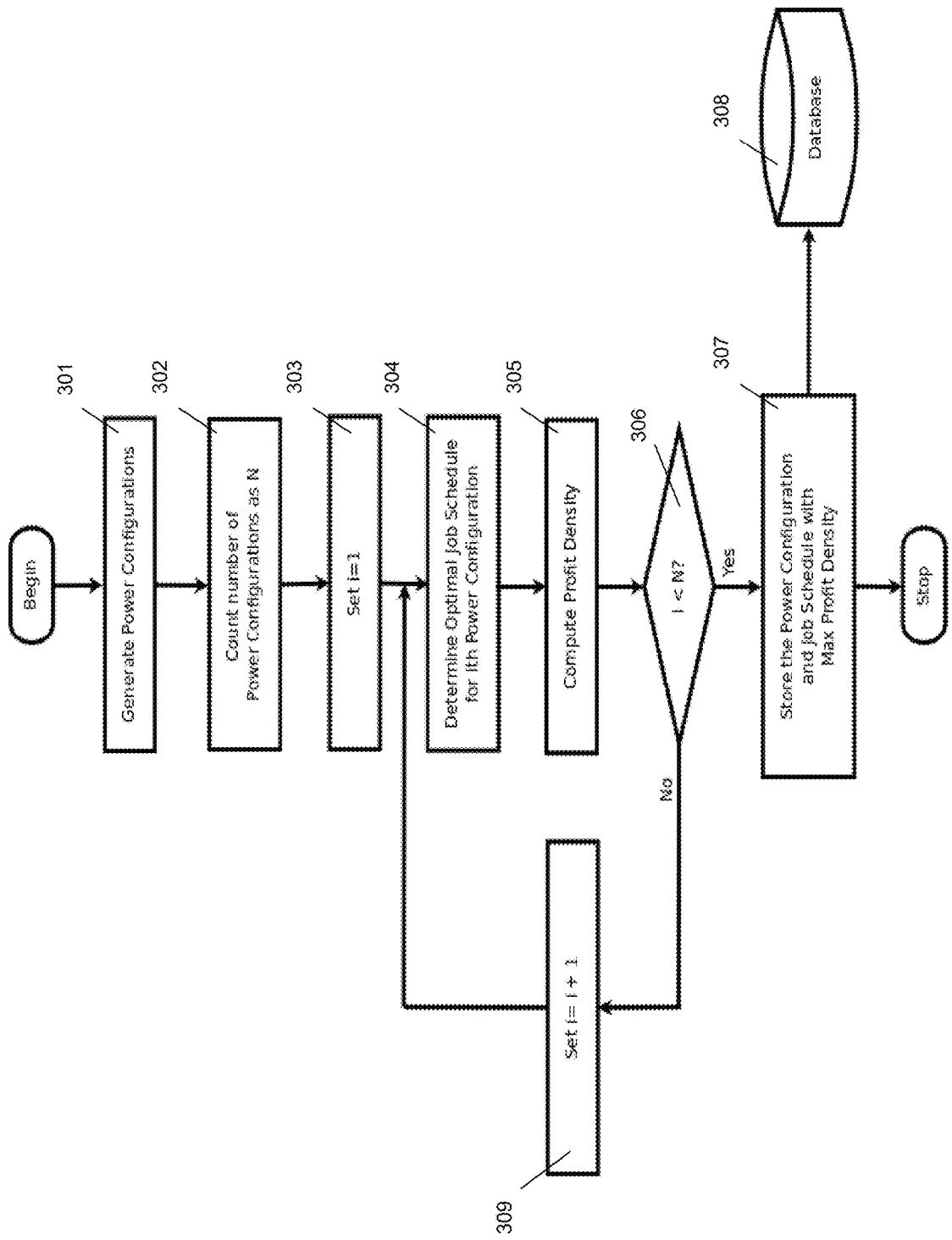
FIG. 3 depicts a process for determining power source configurations with a numerable arrangement of power sources and/or jobs.

FIG. 3 depicts a process, in accordance with an embodiment of the invention, for determining power source configurations for microgrid systems with a numerable arrangement of power sources and jobs requiring scheduling time slots. The process starts by generating the available power configurations 301, which could be done in multiple ways, such as heuristically or using techniques from the design of system experiments. Next, the number of available configurations is determined 302. Then, starting with the first power configuration 303, for each power configuration the process computes the near-optimal, heuristic-driven schedule of jobs 304 and the profit density 305, while maintaining the tuple of power source configuration and profit. After all of the power source configurations have been processed, the scheduling system may store 308 and utilize the power source configuration with the maximum profit density 309.

Figure 4:
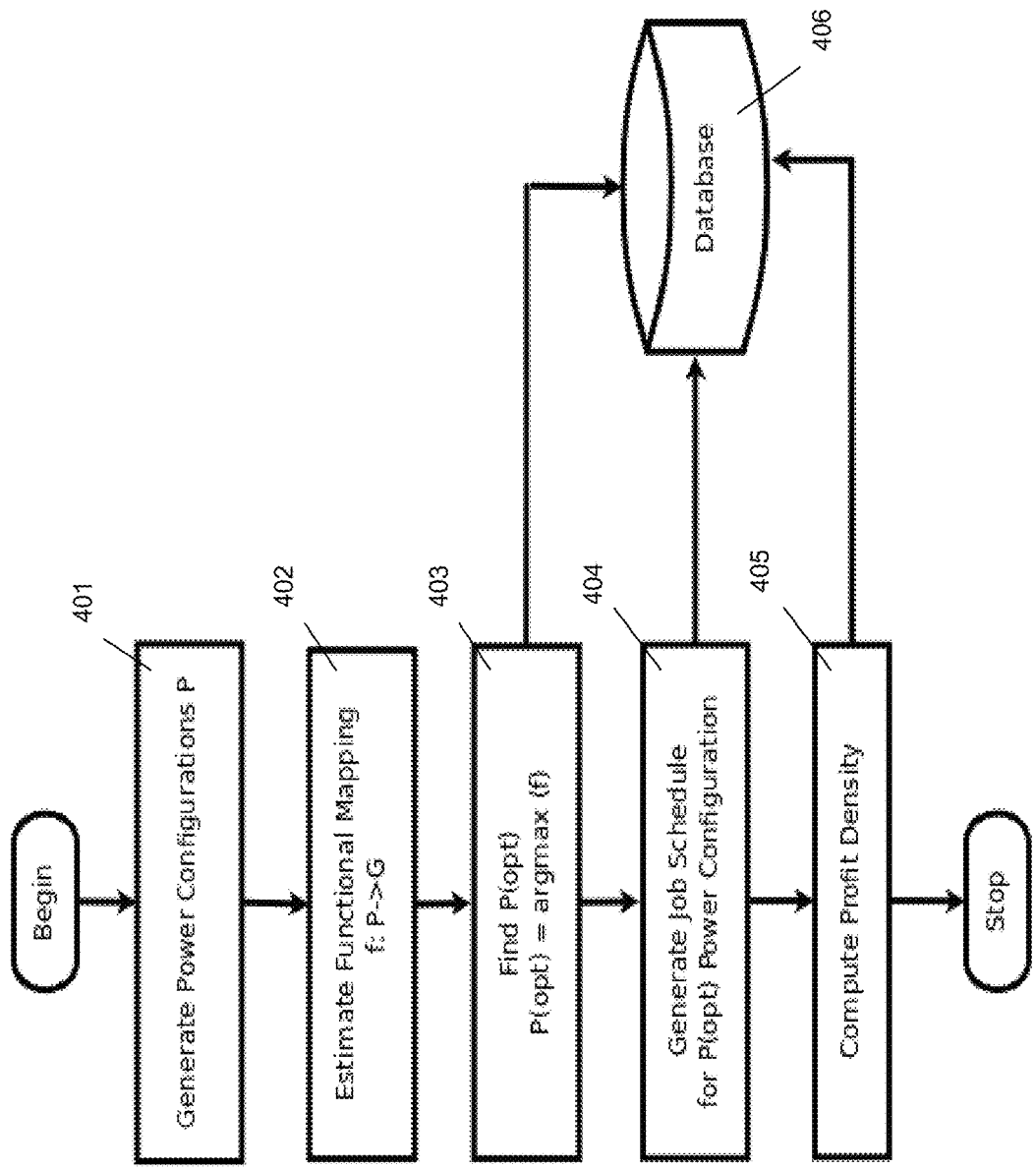
FIG. 4 depicts a process for determining power source configurations for systems with a large number of power sources and/or jobs.

FIG. 4 depicts a process, in accordance with an embodiment of the invention, for determining power source configurations for microgrid systems with a large number of power sources and/or jobs requiring scheduling time slots. The process starts by generating the power configurations for the microgrid system 401. Then, function approximation techniques, such as a support vector regression technique, are employed to fit a hyper-surface for the instances [P,G]

402. The hyper-surface is essentially the map f: P→G, from which the estimated profit G(P) for any given power configuration P can be derived.

Then, argmax_P f(P) is determined 403, which will give a preferred power source configuration for maximizing profit. Profit is non-linear in its relation to power configuration. As such, the derived function, f(P) will be non-convex in nature and it may be difficult to apply deterministic convex optimization techniques to obtain the optimal point of f(P). Thus, stochastic search (for example, simulated annealing or genetic algorithms) or deterministic gradient search are applied to obtain globally optimal configurations. The search space is bound such that every component of P lies in [0,C], where C is the maximum power capacity of a single power source. The optimal power source configuration for maximizing profit is given by P(Opt)=argmax(Opt) 403. Next, the job schedule for the P(Opt) power configuration is generated 404, which is followed by the computation of profit density 405. The results of P(Opt)=argmax(Opt) 403, the job schedule for the P(Opt) power configuration, and the profit density may be stored in a database 406.

According to an embodiment of the invention, a preferred schedule of jobs could be determined by choosing an appropriate sample of different power source configurations, then, for each configuration, computing a near-optimal, heuristic-driven, and feasible schedule of the jobs, while maintaining the profit of the schedule. The sample of different power source configurations could be done heuristically or using techniques from the design of system experiments. Next, based on the configuration and profit tuples, an appropriate power configuration may be inferred. Then, for the selected power configuration, the job schedule may be determined by computing a near-optimal, heuristic-driven, and feasible schedule of jobs.

According to embodiments of the invention, jobs are scheduled using one or more of the following steps: compute expected costs, compute profit density, perform prioritized scheduling, and perform local search.

Embodiments of the invention provide that computing expected costs involves, for each job J, letting $D_J$ be the sum of the durations of all of J's tasks, $S_J$ be the earliest time at which the job can be started, and $E_J$ be the latest time at which the job must be completed. For each task $T_{ji}$ of duration d of this job, all allowable time slots of length d (between $S_J$ and $E_J$) are considered while the specified temporal order of the tasks is maintained. For each of these slots, the cost (as if the task were scheduled at that slot) is computed as the sum of unit cost of power (of the active power source) multiplied by the duration d. In addition, embodiments of the invention provide that the cost is computed as the sum of unit cost of power (of the active power source) multiplied by the duration d and the cost of the carbon footprint. The average cost over all of these slots is the expected cost of $T_{ji}$. The expected cost of the job J is the sum of the expected costs of all of its constituent tasks.

Figure 5:
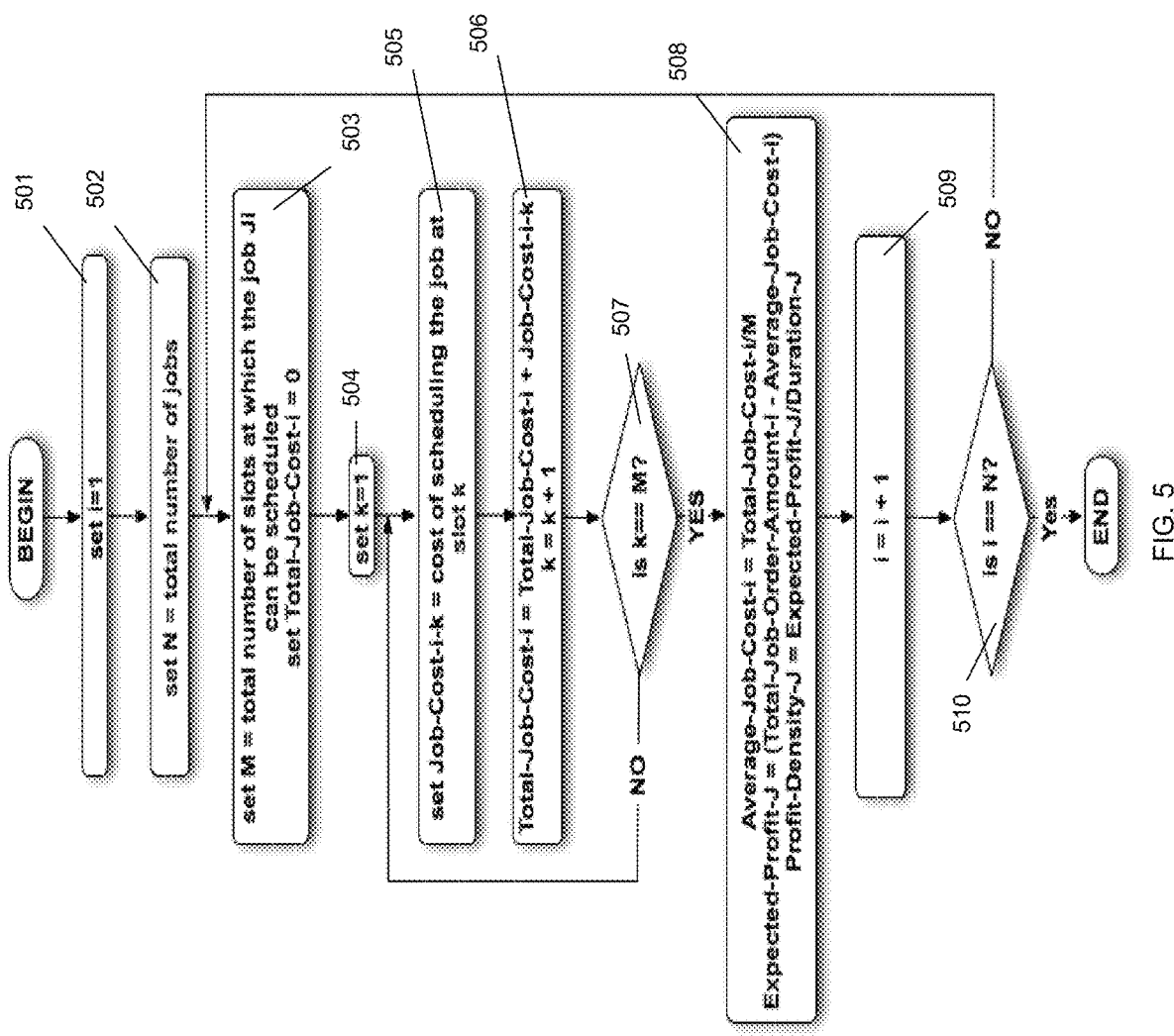
FIG. 5 depicts a process for determining profit density.

According to a preferred embodiment, profit density is determined for each job J by first calculating expected profit as Total Job Rate—Expected Cost, then normalizing it by the duration, such that profit density is computed as expected profit/D. Referring now to FIG. 5, therein is depicted a process for determining profit density according to a preferred embodiment of the invention. The process begins by looking at the first job, where $J_i=J_1$, 501 of the total set of system jobs (N) 502. Next, the total number of slots at which $J_i$ can be scheduled (M) is determined 503 and the total job cost for $J_i$ (Total-Job-Cost-i) is set to zero (0) 503. The slot counter (k) is then set equal to one (1) 504. The job cost of scheduling $J_i$ in the current slot (Job-Cost-i-k) is set to the cost of scheduling the current job at slot k 505. This value is then added to the job cost for $J_i$ in order to update the total job cost for $J_i$ 506, and the slot counter is incremented by one (1) 506. Steps 505 and 506 of FIG. 5 are repeated until k equals M 507. Once k equals M 507, the average job cost for $J_i$ (Average-Job-Cost-i) is set to the total job cost for $J_i$ (Total-Job-Cost-i) divided by M 508. In addition, the job's expected profit (Expected-Profit-J) is set to the total job order amount for $J_i$ (Total-Job-Order-Amount-i) subtracted by $J_i$'s average job cost (Average-Job-Cost-i) 508. Furthermore, the job's profit density (Profit-Density-J) is set to Expected-Profit-J divided by the job's duration (Duration-J) 508.

According to embodiments of the invention, prioritized job scheduling is performed for each job priority class by starting from the highest to the lowest priority class and performing the following steps to compute actual profit: determine the set of jobs in the given priority class and consider the jobs in decreasing order of profit density; for each job, schedule all of its tasks at the earliest possible time without violating specified order and considering all topological orderings; if no slot is feasible (for example, if required machines are not available and/or power capacity is insufficient), defer or tentatively reject the job; repeat the steps until all of the jobs in all of the priority classes have been considered and scheduled. In addition, the computed schedule may not be optimal until sliding and/or swapping of jobs through local search methods according to embodiments of the invention have been factored in to the process in order to accommodate jobs that have been deferred or tentatively rejected.

Figure 6:
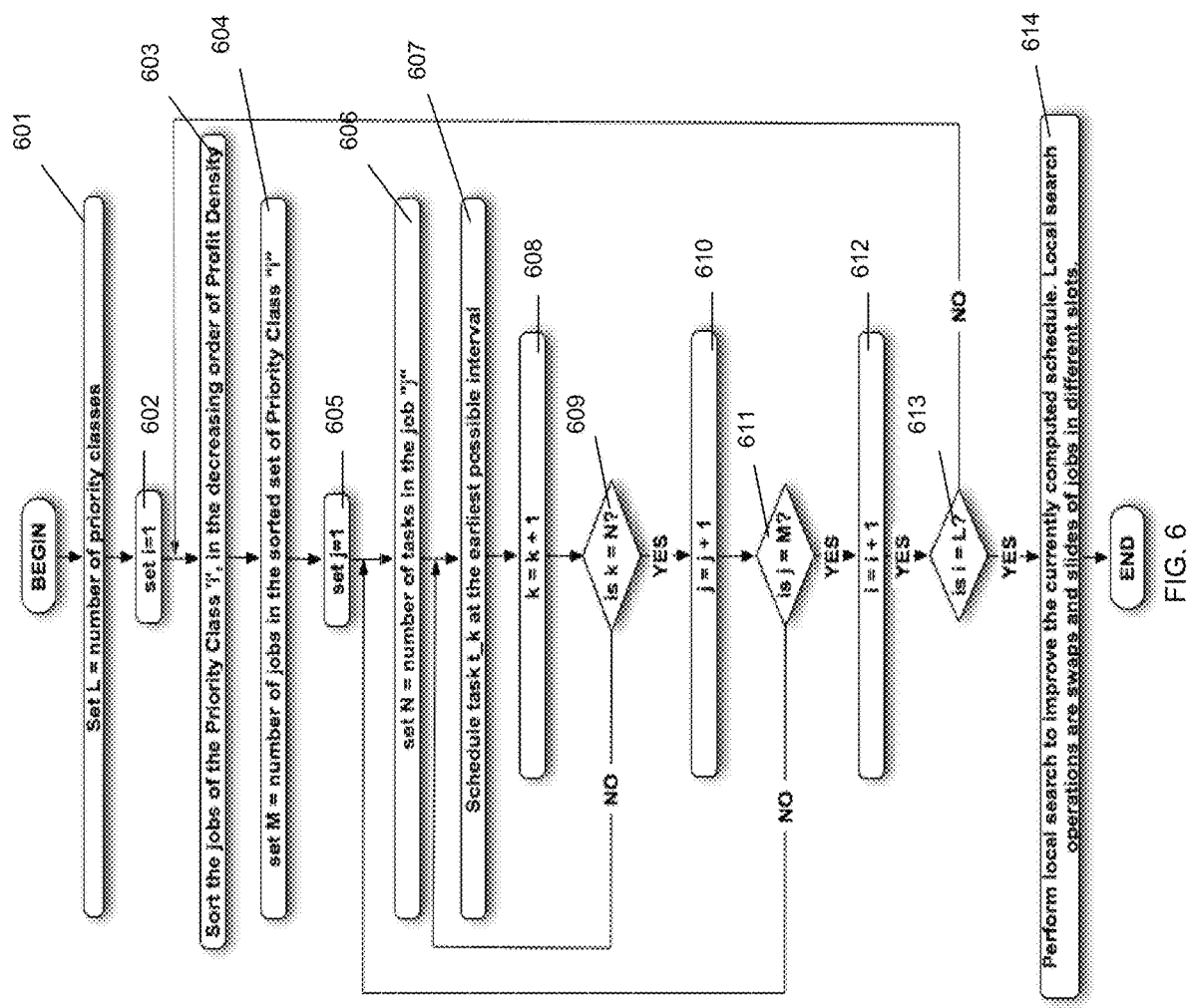
FIG. 6 depicts a process for prioritized job scheduling.

Referring now to FIG. 6, therein is depicted a process for prioritized job scheduling according to a preferred embodiment of the invention. The process begins by determining the number of priority classes (L) 601. Each priority class is prioritized starting with the first priority class (Priority Class i=1) 602. The jobs belonging to each priority class are sorted in decreasing order of profit density 603 and the number of jobs for the sorted priority class (M) is determined 604. The process then looks at the first job in the priority class (j=1) 605 and determines the number of tasks in the current job (N). 606. Next, the process schedules the current task at the earliest possible interval 607 and determines whether there are any other tasks in the current job 608 and 609. The process continues to schedule the tasks in the current job until all of the tasks have been scheduled 609. Once all of the tasks for the current job have been scheduled, the process moves on to the next job ($job_{i+1}$) 610. If the current job does not equal M 611, then the process determines the number of tasks in the job 606 and schedules the job's tasks at the earliest possible intervals 607-609. Once all of the priority classes have been scheduled, 613, the process performs local search according to embodiments of the invention 614.

Embodiments of the invention provide that local search is performed by attempting to move jobs, within the given time slots, to accommodate other jobs and/or swap out jobs to accommodate a job yielding a higher profit. During a job slide, a job can be moved within its schedulable window. Embodiments of the invention provide that a job slide is considered only if the job can be moved in such a way that one of the deferred or tentatively rejected jobs can be brought in. During a job swap, a currently scheduled job is deferred or tentatively rejected if a currently deferred or tentatively rejected job of higher profit can be put in its scheduled slot. Embodiments of the invention provide that the local search process is repeated until all such job and/or task reorganization has been exhausted.

Embodiments of the invention provide for a scheduling system that supports job sequencing and specifying tasks within jobs. In addition, embodiments provide that the list of tasks can be specified as directed acyclic graphs and the scheduling system attempts all possible topological ordering when determining task scheduling. Furthermore, embodiments provide that the priority for jobs can be specified and jobs will be scheduled in a prioritized order. Moreover, embodiments provide that profits for jobs can be specified and job scheduling is configured to maximize the profit.

An illustrative use-case scenario provides a non-limiting example of embodiments of the invention. In this example, there are three machines M1, M2 and M3 as depicted in Table 1, three power sources Main, Diesel Generator and Solar as depicted in Table 2, seven jobs J1-J7 as depicted in Table 3, and the power source configuration as depicted in Table 4.

TABLE 1

| Machine | Power Consumption | Throughput (units/hr) |
| --- | --- | --- |
| M1 | 160 KW | 40,000 |
| M2 | 10 KW | 100,000/3 |
| M3 | 500 KW | 10,000 |

TABLE 2

| Power Source | Capacity | Cost | |
| --- | --- | --- | --- |
| Main | 500 KW | 12 | (6 am-9 am) |
| | | 10 | (9 am-6 pm) |
| | | 12 | (6 pm-9 pm) |
| | | 8 | (9 pm-6 am) |
| Diesel Generator | 200 KW | 38 | (Only usable 6 am-10 pm) |
| Solar | 10 KW | 0 | (10 am-4 pm) |

TABLE 3

| Job | Priority | Units | Machines | Order Amount |
| --- | --- | --- | --- | --- |
| J3 | 1 | 20,000 | M1, M3 | $40,000 |
| J4 | 2 | 100,000 | M1, M2, M3 | $150,000 |
| J5 | 2 | 66,666 | M2 | $75,000 |
| J7 | 2 | 40,000 | M1, M3 | $40,000 |
| J1 | 3 | 20,000 | M1, M3 | $80,000 |
| J0 | 3 | 120,000 | M1 | $75,000 |

TABLE 4

| Time of day | Power Source |
| --- | --- |
| 6 am-12 pm | Main |
| 12 pm-3 pm | Solar |
| 3 pm-6 pm | Diesel |
| 6 pm-6 am | Main |

Embodiments of the invention provide that multiple power source configurations are considered to derive preferred power source configurations. In this non-limiting example use case scenario, the power configuration depicted in Table 4 is one of the considered configurations.

Figure 7:
FIG. 7 provides graphical representations of the example case-study.

Referring now to FIG. 7, therein is depicted a graphical representation of the non-limiting example use-case scenario as initialized 701. The first job to be considered is J3 as it has the highest priority. This job requires machines M1 (for 0.5 hrs) and M3 (for 2 hrs). These tasks are scheduled in the first available slots 702. The next set of jobs to be considered are jobs J4, J5 and J7 as they all have priority 2. However, after computing the expected profit according to an embodiment of the invention, J4 has highest expected profit and therefore is considered first. This job requires machines M1 (for 2.5 hrs), M2 (for 3 hrs) and M3 (for 10 hrs). These tasks are scheduled in the first available slots 703. M3 requires 500 KW of power and, according to embodiments of the invention, can only be scheduled with the Main power source.

According to the non-limiting example, J5 is the next job to be considered as it has the next highest expected profit. This job requires machine M2 (for 2 hrs) and is scheduled in the first available slot 704. The next job to be considered is J7. This job requires machines M1 (for 1 hr) and M3 (for 4 hours). However, this job cannot be scheduled as it requires 500 KW for 4 hours which is not available. The next set of jobs to be considered is J1 and J0. J1 is considered first because it has a higher expected profit. J1 requires machines M1 (for 0.5 hrs) and M3 (for 2 hrs). These tasks are scheduled in the first available time slots in which they fit 705. In addition, M1 cannot be scheduled in the Solar power source because it requires 160 KW, and M3 cannot be scheduled with the Main power source because it requires 500 KW.

J0 is the next job to be scheduled according to the non-limiting example. This job requires machine M1 (for 3 hrs). However, because there is not a slot with 160 KW power availability, for example, the Diesel or Main power sources, where M1 is not already being used, J0 cannot be scheduled at this time. Therefore after all of the jobs have been scheduled, the use-case scenario is graphically represented in FIG. 7 by graph 706.

According to the non-limiting example, at this point in the scheduling process, local search techniques are applied according to embodiments of the invention. In this process, the system repeatedly determines whether shifting any one task or inserting a new job can lead to an increased profit. This process continues until no further profit improvement can be realized. An examination of J4-M2 reveals that it can be shifted to fully use the Solar power source, thereby increasing profit 707. In addition, an examination of J1-M1 reveals that it can be shifted to 11 a.m., where it can use a less costly power source, Main instead of Diesel 708. Furthermore this allows J0 to be inserted and scheduled from 3 p.m.-6 p.m. 708. Finally, an examination of J5-M2 reveals that it can be shifted to 9 a.m., where it can use the Main power source at a less costly rate 709.

It should be noted as well that certain embodiments may be implemented as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
utilizing at least one processor to execute computer code configured to perform the steps of:
identifying one or more power sources within a microgrid power system and one or more jobs associated with one or more local integrated power systems within the microgrid power system, wherein the microgrid power system comprises a power system for a facility having a plurality of machines, wherein the microgrid power system is operatively connected to a main power grid substation and wherein one or more local integrated power systems are separate from the main power grid and local to the microgrid power system, wherein the identifying one or more jobs comprises identifying sub-tasks within the one or more jobs, wherein the one or more jobs comprise one or more overall jobs to be performed by one of the plurality of machines and wherein the sub-tasks comprise steps performed by one of the plurality of machines during performance of the one or more jobs;
ascertaining demand characteristics from the plurality of machines receiving power from the microgrid power system and required for each of the one or more jobs;
ascertaining power characteristics for each of the one or more power sources of the microgrid power system, wherein the power characteristics comprise cost of energy and maximum available power supply;
generating one or more power source configurations from the one or more power sources, wherein a power source configuration comprises a configuration of the one or more power sources at a predetermined time interval, wherein a configuration assigns a power source to each of the sub-tasks of the one or more jobs based upon the power characteristics of the power source, the demand characteristics of the plurality of machines required for each of the one or more jobs, and a priority of each of the jobs, wherein a job having a higher priority is scheduled before a job having a lower priority;

computing a profit density for each of the one or more jobs, via ascertaining profit values for each of the one or more jobs utilizing the one or more power source configurations; and scheduling one or more power sources for the plurality of machines to perform the one or more jobs and the sub-tasks, wherein the scheduling comprises scheduling the one or more power sources based upon and for the sub-tasks of the one or more jobs by selecting the one or more power source configurations for which the profit density is maximized, based at least on the profit density of one or more jobs;

said scheduling comprising computing expected costs, performing prioritized scheduling based on profit density for a job, and subsequently performing a local search, the local search comprising: determining if a scheduled job can move within its required schedule window to allow an additional job to be scheduled, determining if a scheduled job can be swapped with another job having a higher profit density, and iteratively performing the local search until all job reorganization has been exhausted.

2. The method according to claim 1, wherein the job characteristics for each of the one or more jobs comprises a priority, one or more sub-tasks, energy consumed, expected costs, and a duration.

3. The method according to claim 2, wherein the one or more sub-tasks comprise required machines and sub-task duration.

4. The method according to claim 1, wherein the power characteristics for each of the one or more power sources further comprises power source type and availability.

5. The method according to claim 1, wherein:
computing a profit density comprises determining a profit density for each of the one or more jobs; and
scheduling comprises:
determining a priority and one or more sub-tasks for each of the one or more jobs;
ascertaining one or more priority classes based on priorities of the one or more jobs; and
evaluating each job in each of the one or more priority classes in decreasing order of profit density, wherein evaluating each job in each of the one or more priority classes comprises:
scheduling each of the one or more sub-tasks of the one or more jobs in a time slot as early as possible without violating sub-task order;
deferring a job if no time slot is available; and
repeating the scheduling of the one or more sub-tasks of the one or more jobs until each of the one or more jobs in the one or more priority classes have been evaluated.

6. The method according to claim 1, wherein the one or more power sources comprises a photovoltaic and a fossil fuel power generator.

7. A system, comprising
one or more processors; and
a non-transitory computer-readable storage medium having computer-readable program code embodied therewith and executable by the one or more processors, the computer-readable program code comprising:
one or more integrated power systems;
computer readable program code configured to identify one or more power sources within a microgrid power system and one or more jobs associated with one or more local integrated power systems within the microgrid power system, wherein the microgrid power system comprises a power system for a facility having a plurality of machines, wherein the microgrid power system is operatively connected to a main power grid substation and wherein one or more local integrated power systems are separate from the main power grid and local to the microgrid power system, wherein the identifying one or more jobs comprises identifying sub-tasks within the one or more jobs, wherein the one or more jobs comprise one or more overall jobs to be performed by one of the plurality of machines and wherein the sub-tasks comprise steps performed by one of the plurality of machines during performance of the one or more jobs;

computer readable program code configured to ascertain a set of demand characteristics from the plurality of machines receiving power from the microgrid power system and required for each of the one or more jobs;

computer readable program code configured to ascertain a set of power characteristics for each of the one or more power sources of the microgrid power system, wherein the power characteristics comprise cost of energy and maximum available power supply;

computer readable program code configured to generate one or more power source configurations from the one or more power sources, wherein a power source configuration comprises a configuration of the one or more power sources at a predetermined time interval, wherein a configuration assigns a power source to each of the sub-tasks of the one or more jobs based upon the power characteristics of the power source, the demand characteristics of the plurality of machines required for each of the one or more jobs, and a priority of each of the jobs, wherein a job having a higher priority is scheduled before a job having a lower priority;

computer readable program code configured to compute a profit density for each of the one or more jobs, via ascertaining profit values for each of the one or more jobs utilizing the one or more power source configurations; and computer readable program code configured to schedule one or more power sources for the plurality of machines to perform the one or more jobs and the sub-tasks, wherein the scheduling comprises scheduling the one or more power sources based upon and for the sub-tasks of the one or more jobs by selecting the one or more power source configurations for which the profit density is maximized, based at least on the profit density of one or more jobs;

the scheduling comprising computing expected costs, performing prioritized scheduling based on profit density, and subsequently performing a local search, the local search comprising: determining if a scheduled job can move within its required schedule window to allow an additional job to be scheduled, determining if a scheduled job can be swapped with another job having a higher profit density, and iteratively performing the local search until all job reorganization has been exhausted.

8. The system according to claim 7, wherein the set of job characteristics for each of the one or more jobs comprises a priority, one or more sub-tasks, energy consumed, expected costs, and a duration.

9. The system according to claim 8, wherein the one or more sub-tasks comprise required machines and sub-task duration.

10. The system according to claim 7, wherein the set of power characteristics for each of the one or more power sources comprises power source type and availability.

11. The system according to claim 7, wherein the one or more power sources comprises a photovoltaic and a fossil fuel power generator.

12. A computer program product comprising:
a non-transitory computer readable storage medium having computer readable program code embodied therewith, the computer readable program code comprising:
computer readable program code configured to identify one or more power sources within a microgrid power system and one or more jobs associated with one or more local integrated power systems within the microgrid power system, wherein the microgrid power system comprises a power system for a facility having a plurality of machines, wherein the microgrid power system is operatively connected to a main power grid substation and wherein one or more local integrated power systems are separate from the main power grid and local to the microgrid power system, wherein the identifying one or more jobs comprises identifying sub-tasks within the one or more jobs, wherein the one or more jobs comprise one or more overall jobs to be performed by one of the plurality of machines and wherein the sub-tasks comprise steps performed by one of the plurality of machines during performance of the one or more jobs;
computer readable program code configured to ascertain a set of demand characteristics from the plurality of machines receiving power from the microgrid power system and required for each of the one or more jobs;
computer readable program code configured to ascertain a set of power characteristics for each of the one or more power sources of the microgrid power system, wherein the power characteristics comprise cost of energy and maximum available power supply;
computer readable program code configured to generate one or more power source configurations from the one or more power sources, wherein a power source configuration comprises a configuration of the one or more power sources at a predetermined time interval, wherein a configuration assigns a power source to each of the sub-tasks of the one or more jobs based upon the power characteristics of the power source, the demand characteristics of the plurality of machines required for each of the one or more jobs, and a priority of each of the jobs, wherein a job having a higher priority is scheduled before a job having a lower priority;
computer readable program code configured to compute a profit density for each of the one or more jobs, via ascertaining profit values for each of the one or more jobs utilizing the one or more power source configurations; and
computer readable program code configured to schedule one or more power sources for the plurality of machines to perform the one or more jobs and the sub-tasks, wherein the scheduling comprises scheduling the one or more power sources based upon and for the sub-tasks of the one or more jobs by selecting the one or more power source configurations for which the profit density is maximized, based at least on the profit density of one or more jobs;
the scheduling comprising computing expected costs, performing prioritized scheduling based on profit density for a job, and subsequently performing a local search, the local search comprising: determining if a scheduled job can move within its required schedule window to allow an additional job to be scheduled, determining if a scheduled job can be swapped with another job having a higher profit density, and iteratively performing the local search until all job reorganization has been exhausted.

13. The method according to claim 1, wherein:
computing a profit density comprises determining a profit density for each of the one or more jobs; and
scheduling one or more power sources for the one or more jobs comprises performing prioritized scheduling via:
determining a priority and one or more sub-tasks for each of the one or more jobs;
ascertaining one or more priority classes based on priorities of the one or more jobs; and
evaluating each job in each of the one or more priority classes in decreasing order of profit density.

14. The method according to claim 6, wherein said scheduling comprises utilizing weather forecasts to defer a job which uses the photovoltaic generator.

* * * * *